United States Patent
Jones et al.

(10) Patent No.: US 7,373,595 B2
(45) Date of Patent: May 13, 2008

(54) SYSTEM AND METHOD FOR VALIDATING AN XML DOCUMENT AND REPORTING SCHEMA VIOLATIONS

(75) Inventors: Brian M. Jones, Redmond, WA (US); Marcin Sawicki, Kirkland, WA (US); Robert A. Little, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 482 days.

(21) Appl. No.: 10/184,565

(22) Filed: Jun. 27, 2002

(65) Prior Publication Data

US 2004/0006744 A1    Jan. 8, 2004

(51) Int. Cl.
G06F 15/00    (2006.01)

(52) U.S. Cl. .................. 715/513; 715/517; 715/500

(58) Field of Classification Search ................ 715/513, 715/517, 500, 501.1, 859; 717/124–125, 717/127, 859
See application file for complete search history.

(56) References Cited

U.S. PATENT DOCUMENTS

| | | | | |
|---|---|---|---|---|
| 5,829,004 | A * | 10/1998 | Au | 707/100 |
| 5,900,004 | A | 5/1999 | Gipson | |
| 6,558,431 | B1 * | 5/2003 | Lynch et al. | 715/513 |
| 6,658,622 | B1 * | 12/2003 | Aiken et al. | 715/507 |
| 2003/0103072 | A1 * | 6/2003 | Ko | 345/710 |
| 2003/0136841 | A1 * | 7/2003 | Alleshouse | 235/462.01 |
| 2003/0163603 | A1 * | 8/2003 | Fry et al. | 709/328 |
| 2003/0167446 | A1 * | 9/2003 | Thomas | 715/513 |
| 2003/0177443 | A1 * | 9/2003 | Schnelle et al. | 715/513 |
| 2003/0210260 | A1 * | 11/2003 | Palmer et al. | 345/715 |
| 2003/0236903 | A1 * | 12/2003 | Piotrowski | 709/231 |
| 2004/0143792 | A1 * | 7/2004 | Demopoulos et al. | 715/513 |
| 2004/0205592 | A1 * | 10/2004 | Huang | 715/513 |

OTHER PUBLICATIONS

Shankar, Gess, "Able XML Pro Still Rough Around The Edges", *InfoWorld*, vol. 21, No. 33, (Sep. 6, 1999).
*Making XML Content Creation Easy*—www3.corel.com; 2002 Corel Corporation.
SoftQuad Software Inc. Announces XMetal. Latest XML/SGML Content Authoring Tool; No Author; 98-1117 Document Type-Business Wire Source of Article(s)—Newswire; Toronto, Canada (BUSINESS WIRE) Nov. 17, 1998.
Alexander, George A. et al., "Page Layout and Composition Systems; Catalog Publishing Software", *Seybold Report on Publishing Systems*, vol. 29, No. 18, pp. 35, (Aug. 21, 2000).
Sloman, Greg, "XMLwriter", *Internet Magazine*, pp. 30 (May 1, 2000).

(Continued)

*Primary Examiner*—Thu Huynh
(74) *Attorney, Agent, or Firm*—Merchant & Gould P.C.

(57) ABSTRACT

A system and method for validating an extensible markup language (XML) document and reporting schema violations in real time. A parallel tree is maintained that includes nodes corresponding to non-native XML elements of the XML document. When changes occur to the XML document, the non-native XML elements corresponding to the changes are marked. The nodes corresponding the marked non-native XML elements are validated against an XML schema that corresponds to the non-native XML markup. The elements and nodes corresponding to errors in the non-native XML markup are then reported to the user according to display indicators in the XML document and the parallel tree.

20 Claims, 8 Drawing Sheets

OTHER PUBLICATIONS

"Webwriter", *Internet Magazine*, pp. 131, (Feb. 1, 2000).

XInterfaces—a new schema language for XML, Retrieved from the Internet: URL:http://xml.coverpages.org/xmlPapers2002Q2.html>[retrieved on May 22, 2007].

Chang B et al: Document Object Model (DOM) Requirements, Online Publication—W3C Working Draft, Apr. 19, 2001, XP002434432.

Bray T et al: Namespaces in XML, Jan. 14, 1999, Retrieved from the Internet: URL:http://www.w3.org/TR/1999/REC-xml-names-19990114/>[retrieved on May 22, 2007].

XInterfaces - a new schema language for XML, Retrieved from the Internet: URL: http://xml.coverpages.org/xmlPapers2002Q2.html>[retrieved on May 22, 2007].

Chang B et al: Document Object Model (DOM) Requirements, Online Publication - W3C Working Draft, Apr. 19, 2007 (Apr. 19, 2001), XP002434432.

Bray T et al: Namespaces in XML, Jan. 14, 1999, Retrieved from the Internet: URL:http://www.w3.org/TR/1999/REC-xml-names-19990114/>[retrieved on May 22, 2007].

* cited by examiner

SYSTEM AND METHOD FOR VALIDATING AN XML DOCUMENT AND REPORTING SCHEMA VIOLATIONS

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is commonly used to uniquely identify each class of XML document. Each XML document can use a namespace to allow processes to easily identify the type of XML associated with the document. The unique namespaces may also assist to differentiate markup elements that come from different sources and happen to have the same name.

XML Schemata provide a way to describe and validate data in an XML environment. A schema states what elements and attributes are used to describe content in an XML document, where each element is allowed, and which elements can appear within other elements. The use of schemata ensures that the file is structured in a consistent manner. Schemata may be created by a user and generally supported by an associated markup language, such as XML. By using an XML editor that supports schema, the user can manipulate the XML file and generate XML documents that adhere to the schema the user has created.

Commonly, when an element or tag is inserted into an XML document that is incorrect the XML editor refuses to allow the user to continue composing the XML document without addressing the error. In such a case, the XML editor simply disallows edits to an XML document that are erroneous with respect to the schema, such that editor does not provide freestyle editing. Another option for editors is to allow the user to generate the entire XML document, and then subsequently validate the XML document in its entirety. Errors occurring upon validating the entire XML document will then need to be found and corrected.

SUMMARY OF THE INVENTION

The present invention is directed at enabling validation of an extensible markup language (XML) document and reporting of schema violations in real time as a user edits the document. A word-processor has an associated extensible markup language (native XML). When a user associates a non-native XML schema file with an XML document, the word-processor uses the non-native XML schema with a validation engine to validate the non-native XML elements in the XML document. As the user inserts non-native XML elements from the schema into the XML document, a parallel tree is maintained by the word processor as an object of the validation engine. The tree includes nodes that correspond to the non-native XML elements inserted into the XML document. The parallel tree assists in preventing the native XML markup from interfering with the non-native XML markup within the XML document. Although the non-native XML markup coexists with the native XML markup within the same XML document, the parallel tree allows the non-native XML markup to be validated separately and independently from the native XML markup.

In one embodiment, each time a non-native XML element is inserted into the XML document, a corresponding node is created in the parallel tree in an appropriate location depending on the context of how the non-native XML element was inserted. Correspondingly, each time the non-native XML element is deleted from the XML document, the corresponding node is deleted from the parallel tree.

In addition to keeping track of the non-native XML elements, the parallel tree is also keeping track of the textual contents of the non-native XML elements. The contents of the non-native XML elements exist in the XML document rather than the parallel tree, but the parallel tree still maintains links to the elements. When needed, the contents are retrieved by the parallel tree for the purpose of the parallel tree validation. The validation process may then validate the parallel tree's structural relationships among the nodes as well as the content type restrictions each node imposes on it's textual content.

The parallel tree reflects the changes in the XML document in real time and allows for real time validation of the non-native XML markup. When an idle moment occurs after a change to the non-native XML markup or the textual contents of the XML document, a sub-tree of the parallel tree corresponding to the region of the XML document where the changes occurred is validated by the validation engine. If there are one or more errors with the change to the non-native XML or the textual contents, the validation engine notifies the word processor of the errors. The word processor then highlights the errors, both within the XML document and within the parallel tree according to user interface instructions for handling such errors.

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application.

In a word-processor file, markup elements may be associated with particular formatting that specifies how the content of the element is to be displayed or laid out. In other documents, such as other XML documents, the markup may be directed to describing data without addressing display considerations.

The terms "native extensible markup language" or "native XML" refer to markup language elements that are associated with a word-processor application and a schema associated with the word-processor application.

The terms "non-native extensible markup language" or "non-native XML" refer to markup language elements that a user or other application has created that adhere to schema different from the native XML schema.

The term "element" refers to the basic unit of an XML document. The element may contain attributes, other elements, content, and other building blocks for an XML document.

The term "tag" refers to a command inserted in a document that delineates elements within an XML document. Each element usually has no more than two tags: the start tag and the end tag. It is possible to have an empty element (with no content) in which case one tag is allowed.

The content between the tags is considered the element's "children" (or descendants). Hence, other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that is not included in the element's content.

Illustrative Operating Environment

Figure 1:
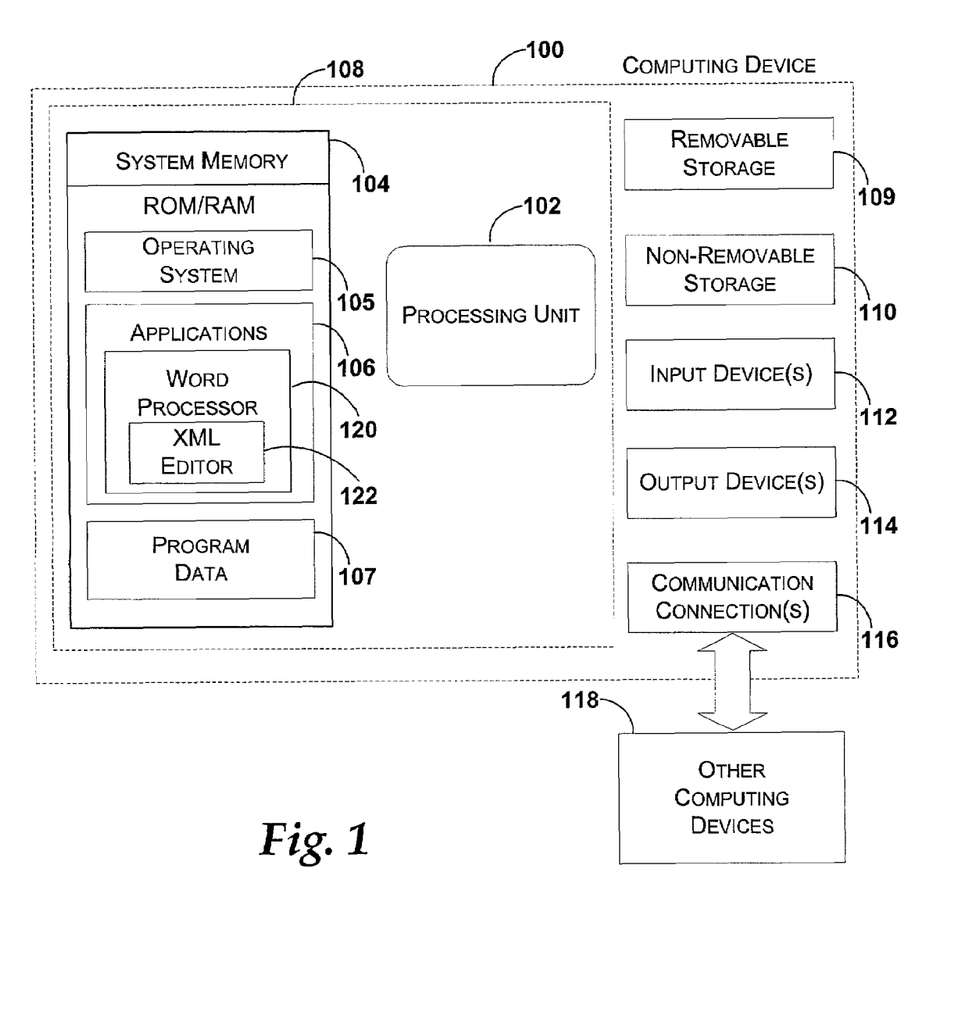
FIG. 1 illustrates an exemplary computing device that may be used in one exemplary embodiment of the present invention.

With reference to FIG. 1, one exemplary system for implementing the invention includes a computing device, such as computing device 100. A basic configuration includes those components within dashed line 108. In the basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, applications 106 includes a word-processor application 120 having an XML editor 122. In this configuration, the word-processor application 120 is able to open and edit XML documents in a freestyle editing environment. Although illustrated here in the context of a word processor application 120, the present invention has equal applicability to other types of applications, as will become apparent to those skilled in the art.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
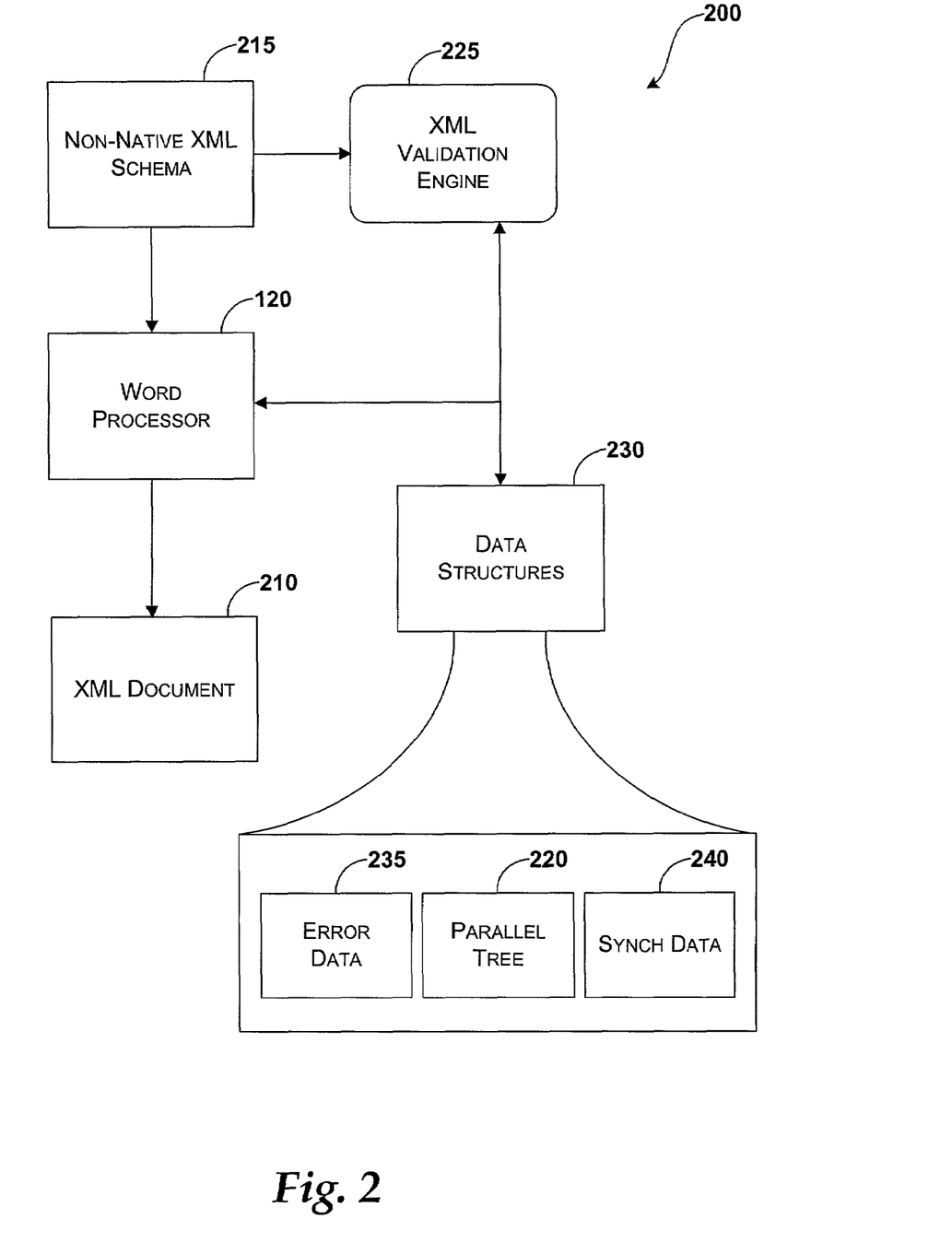
FIG. 2 is a block diagram illustrating an exemplary environment for practicing the present invention.

FIG. 2 is a block diagram illustrating an exemplary environment for practicing the present invention. The exemplary environment 200 shown in FIG. 2 includes word-processor 120, XML document 210, non-native XML schema 215, XML validation engine 225, and data structures 230. Data structures 230 include error data 235, parallel tree 220, and synch data 240.

In one embodiment, word-processor 120 has its own namespace and a schema for use with XML documents associated with word-processor 120. The set of tags and attributes defined by the schema for word-processor 120 may define the format of an XML document to such an extent that it is referred to as its own markup language, a Word-Processor Mark-up Language (native XML). The native XML is supported by word-processor 120 and may adhere to the rules of other markup languages while creating further rules of its own. The native XML provides a markup language that includes rich display information normally associated with word processing, such as textual formatting (e.g., bold, italics, underlining), paragraph formatting (e.g., line spacing, justification, and the like), tabular formatting (e.g., table rows and columns), and the like. The native XML may then be used in conjunction with a user-defined schema that adds more substantive structure to the document.

In accordance with the present invention, native XML and non-native XML elements may coexist within XML document 210 and be validated separately. The non-native XML elements are associated with the non-native XML schema 215. When validated, the non-native XML elements are examined as to whether they conform to non-native XML schema 215. As previously described above, a schema states what tags and attributes are used to describe content in an XML document, where each tag is allowed, what types of contents can appear within elements, and which elements can appear within other elements, ensuring that the documentation is structured the same way. Accordingly, non-native XML elements are valid when structured as set forth in non-native XML schema 215. Validation of the non-native XML elements is described further in the discussion of FIG. 7 below.

The XML validation engine 225 is a module that is configured to maintain an element tree and validate the element tree against some schema. Briefly, the XML validation engine 225 may be passed an object that defines an element tree, such as one that corresponds to elements within the XML document 210, a pointer to a schema, such as non-native XML schema 215, and possibly the content of one or more elements of the element tree. With this information, the XML validation engine 225 validates the element tree against the schema and reports any violations to the calling process.

During routine operation, the word processor 120 maintains several data structures 230 that may participate in the validation of the non-native XML elements, in accordance with one implementation of the present invention. Parallel tree 220 is an element tree that includes nodes corresponding to each non-native XML element within XML document 210. In one embodiment, parallel tree 220 is aware of each element and content of XML document 210, and XML document 210 is aware of the nodes of parallel tree 220. Accordingly, a user may highlight a node in parallel tree 220 and the elements corresponding to that node are also highlighted in XML document 210. Similarly, highlighting a portion of XML document 210 results in the corresponding node(s) of parallel tree 220 also being highlighted. An exemplary parallel tree is described further in the discussion of FIG. 3 below.

Error data 235 includes data returned to the word-processor 120 from XML validation engine 225 when an error has occurred with relation to elements validated by XML validation engine 225. Error data 235 may also include information for displaying a notification of the errors by word-processor 120. In one embodiment, four separate types of errors are reported by word-processor 120 when an error results from validation. The four types of errors include a location error, an invalid contents error, a missing contents error, and an invalid attribute error. Different types of errors may also be used other than the four described. Designating the error as a certain type of error simplifies the analysis that must be performed to rectify the error. Error data 235 may also include further information related to the error, such as suggestions about how to possibly rectify the error which may be displayed to the user. Display and relation of error information is described further with respect to FIG. 8.

Synch data 240 includes data for synchronizing parallel tree 220 with XML document 210 in real time. In one embodiment, synch data 240 includes a table of identifiers that are associated with each element within XML document 210. The identifiers uniquely identify each element within XML document 210, and therefore also uniquely identify each node within parallel tree 220. Synch data 240 assists in synchronizing the changes occurring within XML document 210 with parallel tree 220, including the addition or deletion of nodes within parallel tree 220. An exemplary process that includes steps for adding a node to parallel tree 220 is described in connection with FIG. 6.

Figure 3:
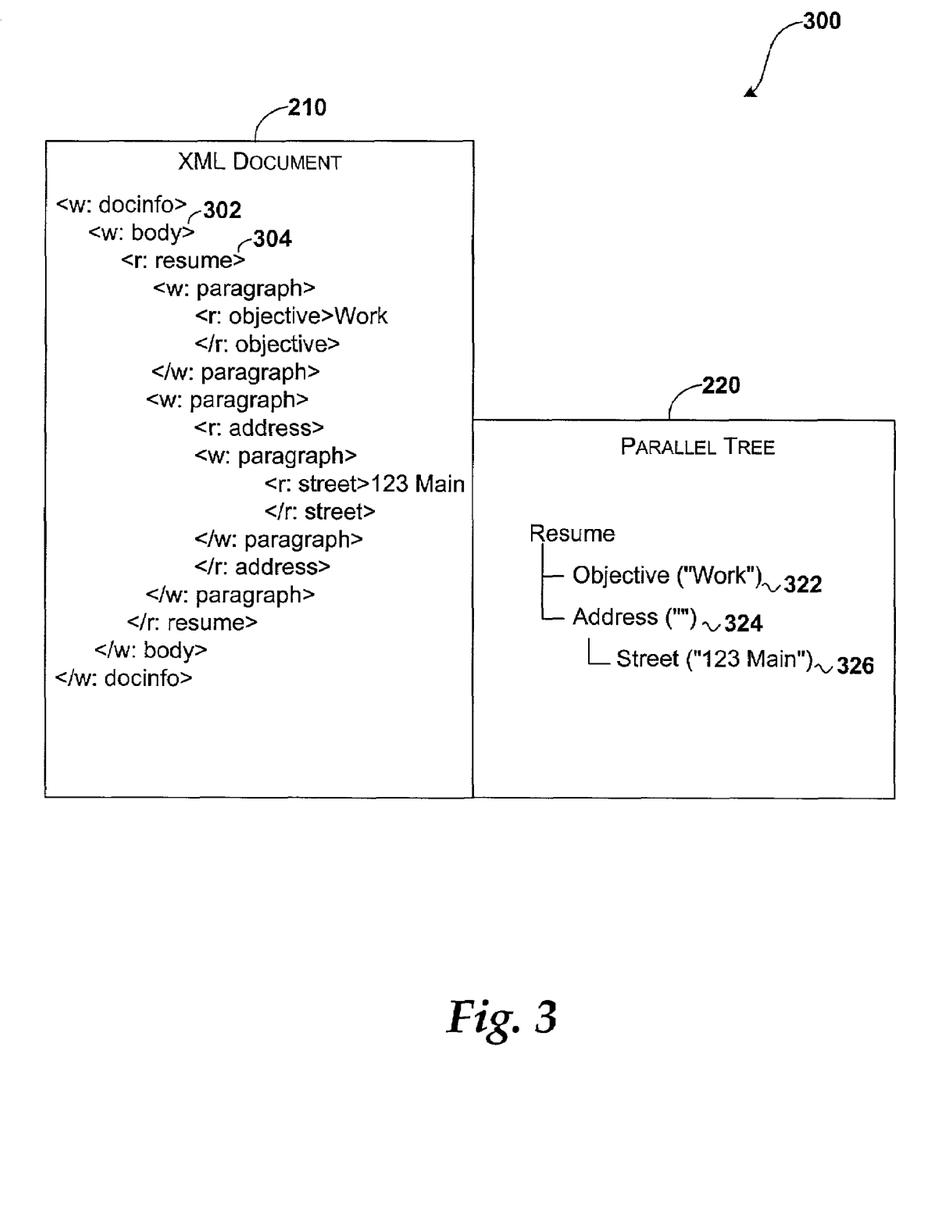
FIG. 3 illustrates an exemplary block diagram of an XML document and parallel tree in accordance with the present invention.

FIG. 3 illustrates an exemplary XML document 210 and parallel tree 220 that may be maintained in accordance with the present invention. XML document 210 includes both native XML elements and non-native XML elements. An element in a markup language usually includes an opening tag (indicated by a "<" and ">"), some content, and a closing tag (indicated by a "</" and ">"). In this example, tags associated with a native XML schema include a "w:" within the tag (e.g., element 302), and tags associated with a non-native XML schema include an "r:" within the tag (e.g., element 304). The tags associated with native XML are referred as being associated with the namespace of the word-processor (word-processor namespace). In contrast, the tags that are associated with non-native XML are referred to as being associated with a different namespace, in this example a "resume" namespace. The elements of XML document 210 may further include content. For example, "Work" is contained within the "objective" element and "123 Main" is contained within the "street" element. The "street" element is included within the "address" element. These elements are defined according to a non-native XML schema corresponding to the resume namespace (e.g., a resume schema) that has been previously provided by the user or another application. The "w:" and the "r:" prefixes serve as XML shorthand notation for those respective namespaces.

Parallel tree 220 includes a node (e.g., nodes 322, 324, 326) for each non-native XML element within XML document 210. In one embodiment, parallel tree 220 is maintained by the validation engine 225 separately from the word processor 120 (see FIG. 2). Parallel tree 220 is updated in real time as XML document 210 is changed. Parallel tree 220 allows word-processor 120 to essentially ignore the native XML elements as it validates the XML document 210 against the non-native XML schema 215. In other words, the native XML elements are effectively transparent to the non-native XML elements when the parallel tree 220 is provided to the validation engine for validation. Parallel tree 220 can then be validated separately from any native XML elements as described further in connection with FIG. 7 below.

As shown, parallel tree 220 includes the content associated with each non-native XML element. In another embodiment, the content is not copied to parallel tree 220 until the parallel tree is passed to the validation engine 225 for validation. In yet another embodiment, the content copied to parallel tree 220 is limited to the content associated with the portion of parallel tree 220 to be validated. Validation of parallel tree 220 is described further in conjunction with FIG. 7.

Figure 4:
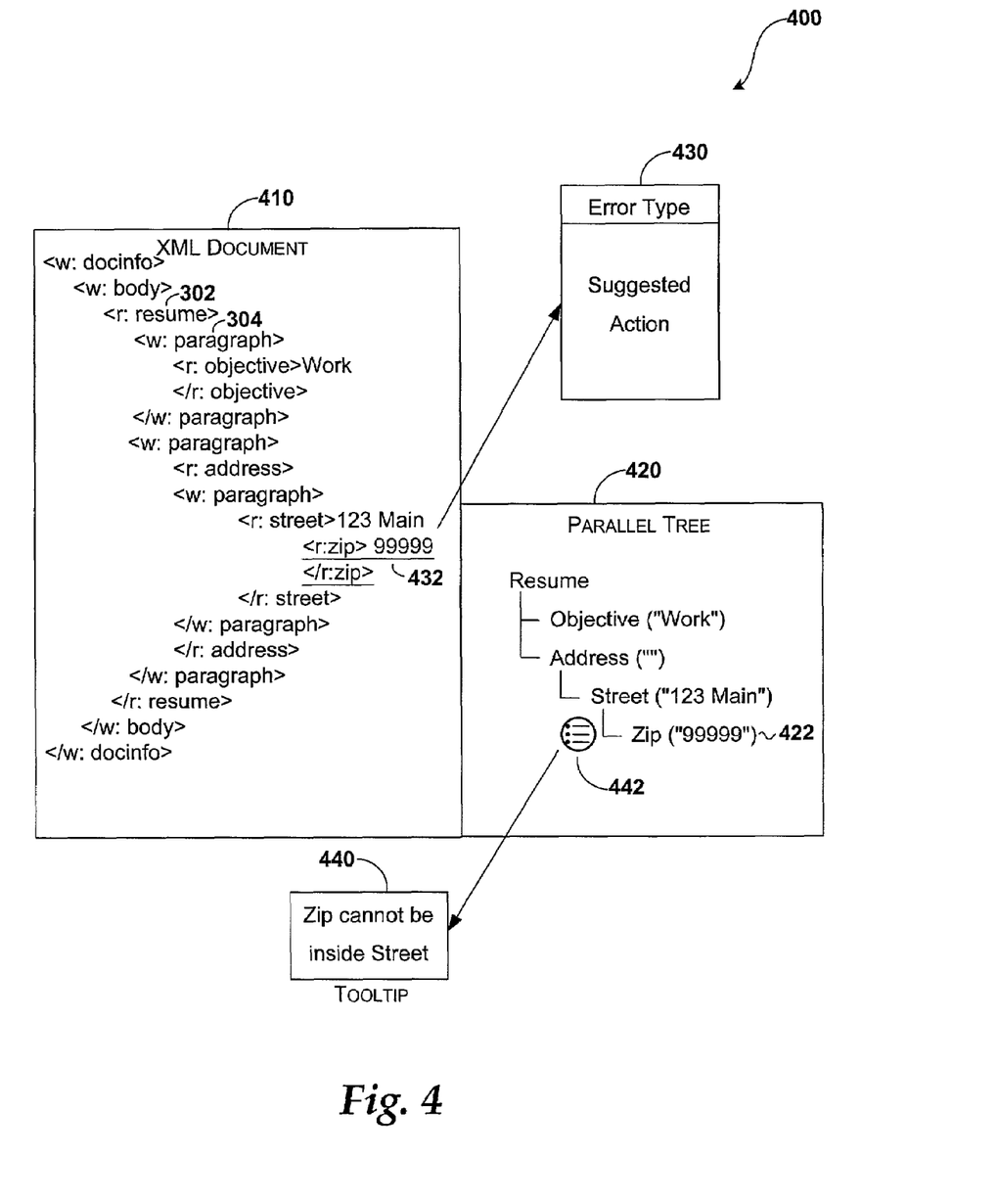
FIG. 4 shows an exemplary block diagram of an XML document and parallel tree that include errors in accordance with the present invention.

FIG. 4 is a block diagram of an exemplary XML document 410 and parallel tree 420 that include errors. XML document 410 and parallel tree 420 are similar to XML document 210 and parallel tree 220 shown FIG. 3, however an error (with respect to the non-native XML schema 215) has been added to the non-native XML markup. The error is represented by error element 432 which is a zip code. In accordance with the non-native XML schema 215, the "zip" element is supposed to be a child of address, or a sibling of the "street" element. However, in illustrated example, the "zip" element is invalid since "zip" was placed as a child of "street". In accordance with the invention, the parallel tree 420 reflects that the "zip" element has been inserted as a child of the "street" element. Accordingly, when the parallel tree 420 (or some relevant sub-tree including the "street" element) is validated against the non-native XML schema 215, an error is returned. In this example, the word-processor 120 identifies the error within XML document 410 with underlining, however other display indicators may be used to indicate the error.

Figure 8:
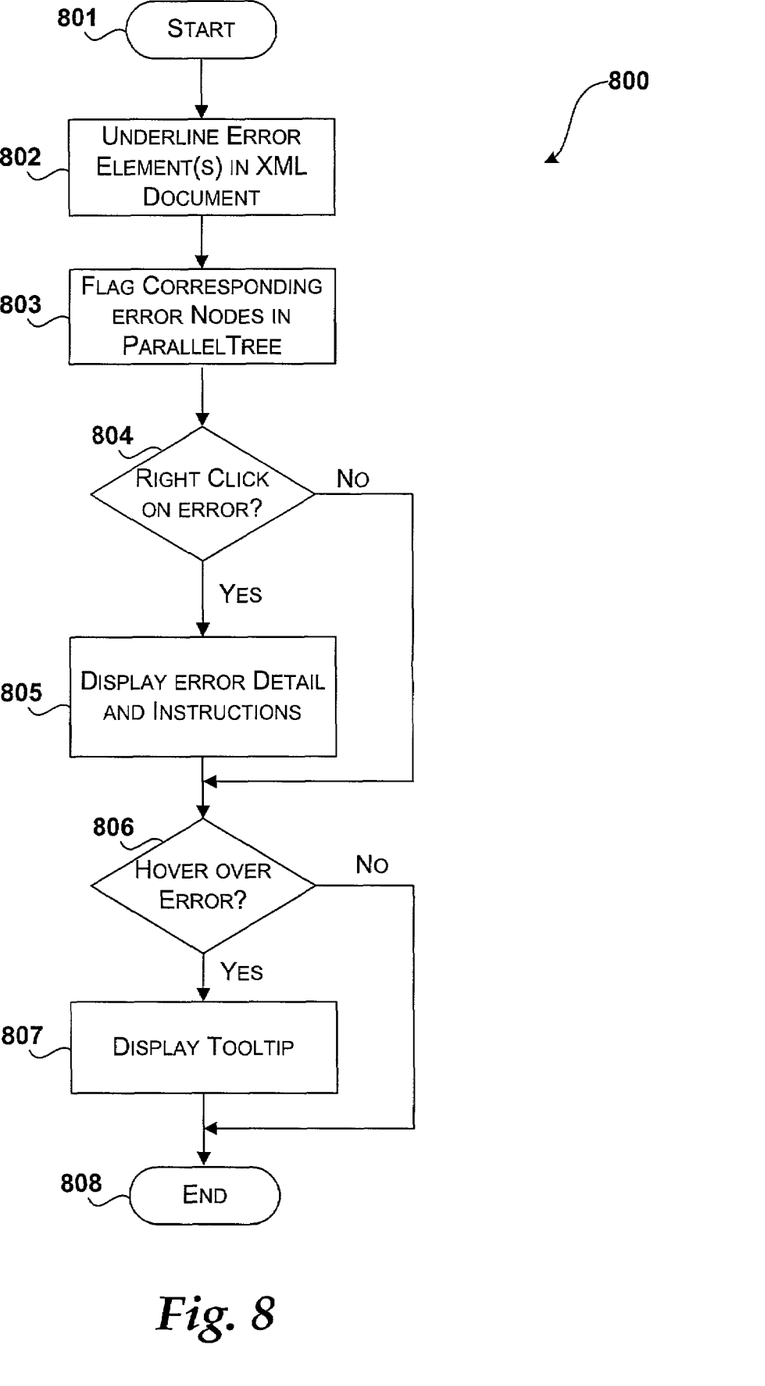
FIG. 8 is a logical flow diagram of an exemplary process for displaying errors in an XML document and parallel tree in accordance with the present invention.

An indication of the error is also included in parallel tree 420, where icon 442 shows that "zip" node 422 has an associated error. In another embodiment, other display indicators may be used within parallel tree 420 to indicate the presence of an error associated with a node. According to the example shown, right-clicking on the underlined element(s) (e.g., error element 432) within the XML document 410 produces error display 430 (e.g., a right-click menu). Error display 430 lists detailed information regarding the error, such as the error type. Error display 430 may also include suggested actions for the user in attempting to rectify the error. The suggested actions may be interactive, allowing a user to pick from a list of possible solutions to the presence of the error.

In addition, hovering over icon 442 may display other information to the user, such as tooltip 440. A "tooltip" usually refers to a non-interactive display element that provides a user with additional information. For example, the tooltip shown provides textual notification that "Zip cannot be inside Street". In one embodiment, either icon 442 or error element 432 may be selected or hovered over to display either error display 430 or tooltip 440. An exemplary process related to displaying the indicators of the error within XML document 410 and parallel tree 420 is described in the discussion of FIG. 8.

Detection, Validation, and Error Reporting

Figure 5:
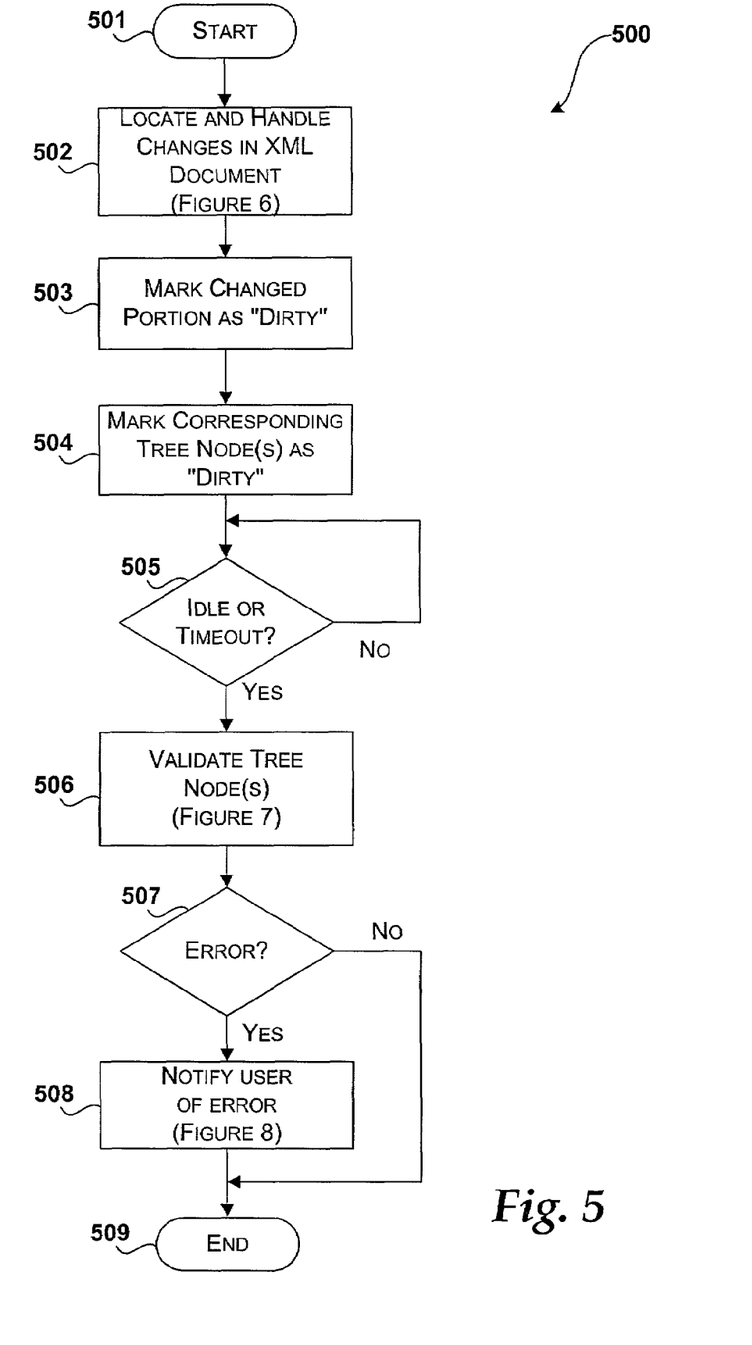
FIG. 5 is a logical flow diagram of an exemplary process for validating XML document and reporting errors in accordance with the present invention.

FIG. 5 is a logical flow diagram of an exemplary process for validating an XML document and reporting schema violations, in accordance with the present invention. The process 500 starts at block 501, where the XML document is being edited and a change has occurred. A "change" refers to inserting, modifying, or deleting XML elements within the XML document, or changing the textual contents of the non-native XML elements. In response to the change, processing continues at block 502.

At block 502, the change that has occurred to the XML document is located within the XML document. Some changes, such as adding new elements, may require further processing to add corresponding nodes to the parallel tree. An exemplary process for locating and handling a change within the XML document is described further in connection with FIG. 6. Processing continues to block 503.

At block 503, the portion of the XML document that was changed is marked as "dirty". "Dirty" refers to the portions of the XML document that have yet to be validated or whose validity is no longer guaranteed because of the change. An identifier or other indicator may be associated with the portion of the XML document where the change occurred. In one embodiment, the parent of any element that has changed, been deleted, or added is marked as dirty. When process 500 proceeds to validate the dirty portion, the validation engine validates the parent and the children of the parent. Processing continues at block 504.

At block 504, the nodes of the parallel tree corresponding to the portion of the XML document that was changed is also marked as "dirty". An identifier or other indicator may be associated with the nodes of the parallel tree corresponding to where the change occurred. In one embodiment, a unique identifier that is associated with each element within the XML document and each node of the parallel tree is marked as dirty, thereby marking both the portion of the XML document and the nodes of the parallel tree as dirty simultaneously. Processing continues at decision block 505.

At decision block 505, a determination is made whether a user composing or editing the XML document has reach an idle or timeout point. Idle refers to a point in time where the user is not currently providing user input to the word processor. Timeout refers to a situation where an idle state has not occurred for a predetermined amount of time. If sufficient time has passed, a timeout condition will occur. Processing loops at block 505 until an idle state or a timeout condition occurs. When an idle state is reached or a timeout condition occurs, processing continues to block 506.

At block 506, the dirty node or nodes of the parallel tree are validated by the validation engine. The parallel tree is an object of, or linked to, the validation engine such that the tree need not be transferred to the validation engine to be validated. An exemplary process for validating the dirty node(s) of the parallel tree is described further in connection with FIG. 7. Processing continues at decision block 507.

At decision block 507, a determination is made whether an error exists in the non-native XML elements of the XML document according to the error data returned by the validation engine. The validation engine returns error data to the word-processor that indicates the validity of each node within the parallel tree analyzed by the validation engine. In one embodiment, the error data includes the type of error that occurred to the word-processor. If no error exists, processing moves to block 509, where processing ends. If an error exists, processing continues at block 508.

At block 508, the user is notified of the error in the non-native XML validation elements according to display indicators within the XML document and within the parallel tree. An exemplary process for reporting the errors that occurred to the user is described further in connection with FIG. 8. Processing continues to block 509, where processing ends.

Figure 6:
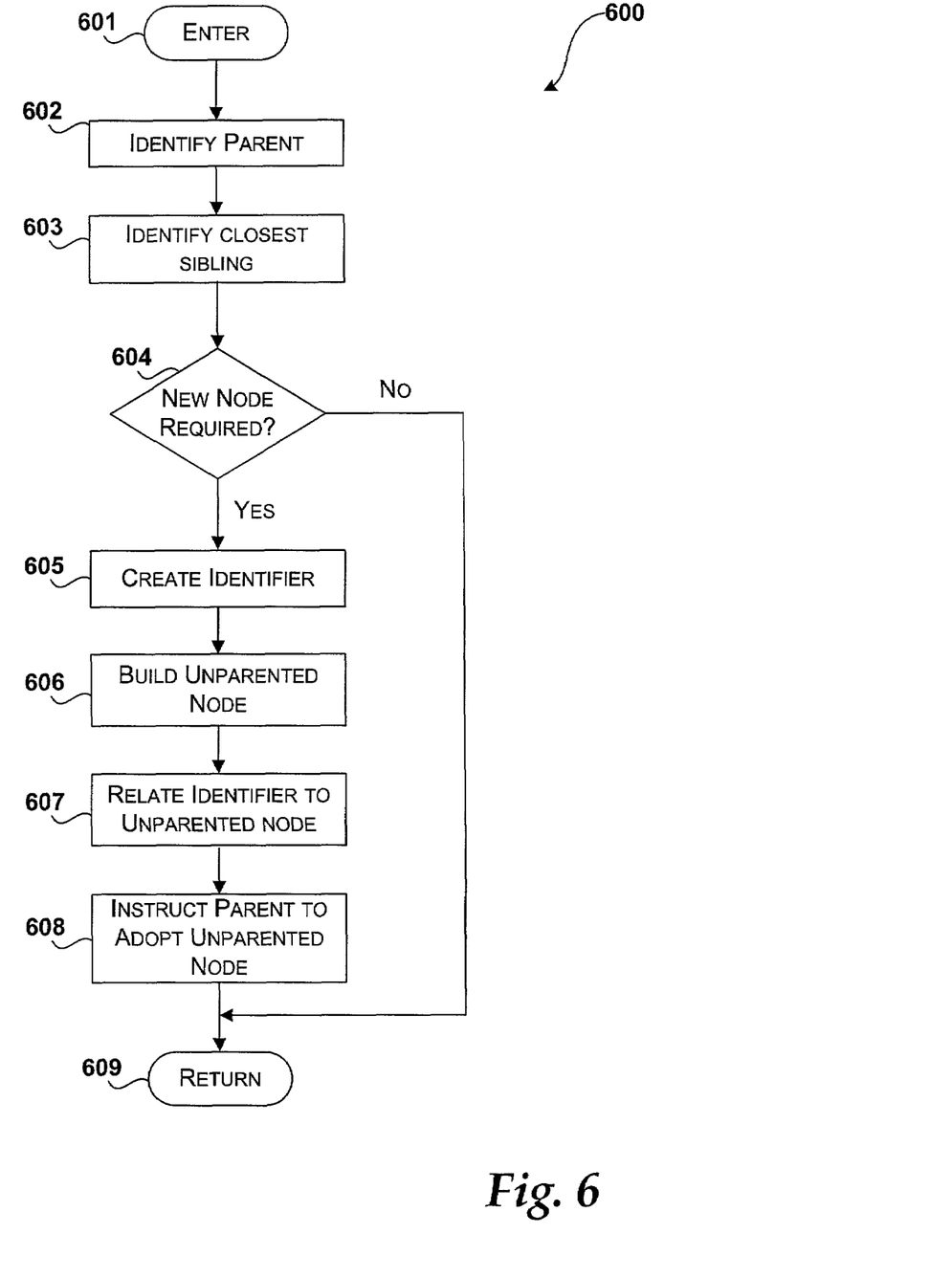
FIG. 6 is a logical flow diagram of an exemplary process for locating and handling changes within an XML document in accordance with the present invention.

FIG. 6 is a logical flow diagram of an exemplary process for locating and handling changes within an XML document in accordance with the present invention. The process 600 enters at block 601 when process 500 shown in FIG. 5 enters block 502. Processing continues at block 602.

At block 602, the parent of the portion of the XML document that has changed is determined. For example, in FIG. 4, the "street" element in XML document 410 is the parent of "zip" element 432. In one embodiment, the parent is determined so that a sub-tree of the parallel node that includes the parent and the parents offspring may be marked as dirty. Validating the parent and the parent's offspring still ensures that the entire XML document is valid because the change should not typically affect the validity of elements other than the immediate parent of the changed node. Determining the parent also assists in synchronization of the parallel tree to the XML document. The parent may then be used as an indicator of the location of the change within the XML document. In one embodiment, an identifier associated with the parent of a changed element is stored within synch data 240 shown in FIG. 2. Processing continues to block 603.

At block 603, the closest sibling(s) of the element(s) being changed are determined by the word processor. For example, in FIG. 3, the "objective" element and the "address" element are considered siblings. Determining the closest sibling assists in synchronization of the parallel tree to the XML document. The closest sibling provides a second indicator of the location of the changes within the XML document. In one embodiment, an identifier associated with the parent of a changed element is stored within synch data 240 shown in FIG. 2. In another embodiment, whether the closest sibling is above or below the element being changed in the XML document is also determined. Processing continues at decision block 604.

At decision block 604, a determination is made whether the change requires a new node to be created within the parallel tree. A new node is required when a new non-native XML element is generated in the XML document. The new node is created in real time to maintain the synchronization of the XML document and the parallel tree. When a new node is not required, processing moves to block 609, where processing returns to block 503 of process 500. However, if a new node is required, processing moves to block 605.

At block 605, an identifier is created that corresponds to the new element within XML document. The identifier uniquely identifies the element within the XML document. Processing continues at block 606.

At block 606, an unparented node is generated within the parallel tree. The unparented node is currently not identified with a parent within the parallel tree. Processing continues at block 607.

At block 607, the identifier related to the element generated within the XML document, is associated with the unparented node. Associating the identifier with the unparented node allows the word-processor to relate the node to a position of the new element within the XML document. In one embodiment, the parent and closest sibling have been determined for the new element within the XML document, and accordingly, the parent and closest sibling within the parallel tree are also determined. Processing continues at block 608.

At block 608, the parent node within the parallel tree corresponding to the parent element of the new element within the XML document is instructed to adopt the unparented node. The new node is then displayed in the correct position within the parallel tree, synchronizing the XML document and the parallel tree. Processing continues to block 609, where processing returns to block 503 of process 500.

Figure 7:
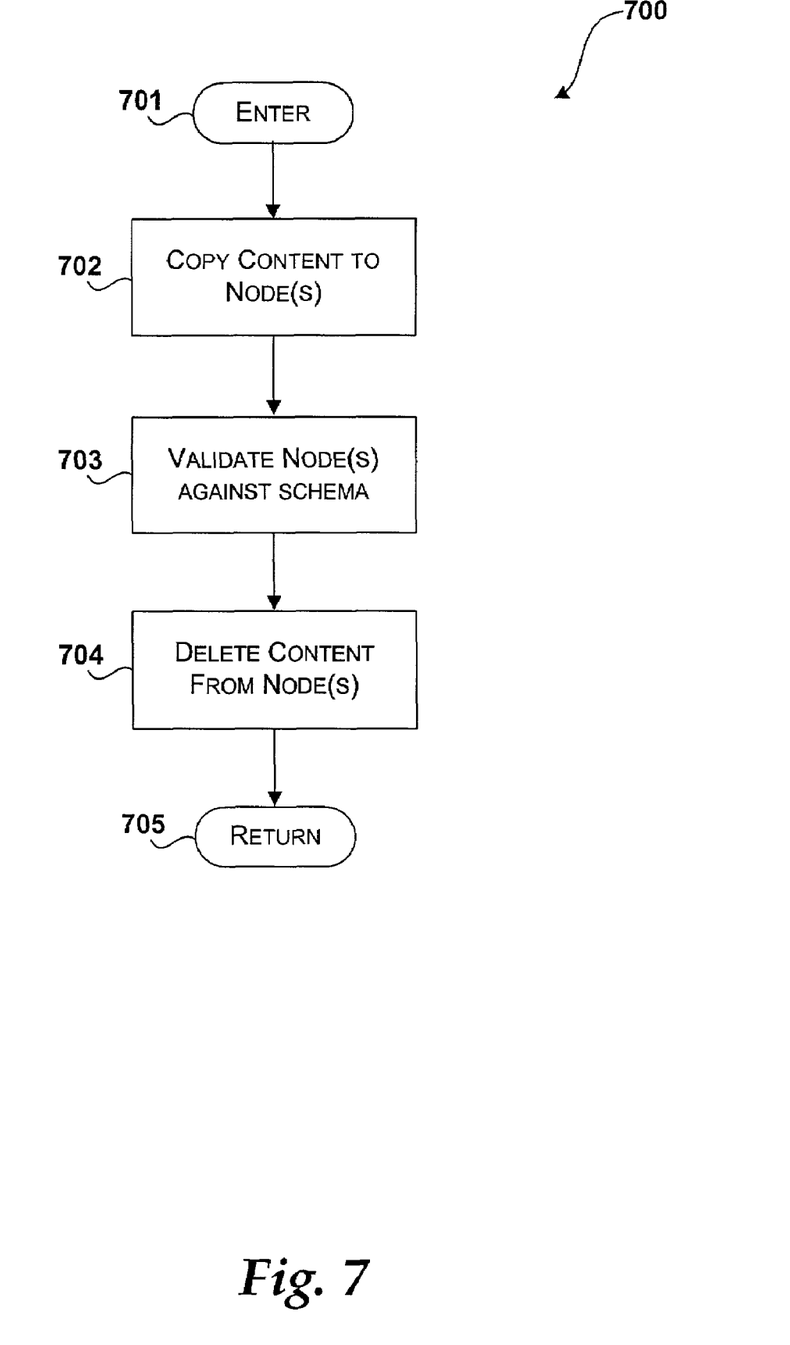
FIG. 7 is a logical flow diagram of an exemplary process for validating an XML document in accordance with the present invention.

FIG. 7 is a logical flow diagram of an exemplary process for validating an XML document in accordance with the present invention. The process 700 enters at block 701 when process 500 shown in FIG. 5 enters block 506. Processing continues at block 702.

At block 702, the content associated with the non-native XML elements to be validated are copied to the parallel tree. In one embodiment, the content of the XML document is not initially included in the parallel tree. If the content were included in the parallel tree, the storage space required for the parallel tree would be nearly the storage space required for the XML document. Copying the content to the parallel tree just before validation minimizes the storage space required for the parallel tree. In another embodiment, the content copied to the parallel tree is limited to the content associated with the non-native XML elements marked as dirty. Processing continues at block 703.

At block 703, the node(s) marked as dirty and their associated content are validated against the non-native XML schema by the validation engine. The non-native XML schema states what tags and attributes are used to describe content in the non-native XML elements of the XML document, where each tag is allowed, what content is acceptable, and which elements may appear within other elements. The parallel XML tree is valid when it adheres to the non-native XML schema. Upon completion of the validation, processing proceeds to block 704.

At block 704, the content included within the parallel tree for the purposes of validation is deleted from the parallel tree. Deleting the content from the parallel tree further minimizes the storage space required for parallel tree. Processing continues to block 705, where processing returns to block 507 of process 500 shown in FIG. 5.

FIG. 8 is a logical flow diagram of an exemplary process for displaying errors in an XML document and parallel tree in accordance with the present invention. The process 800 enters at block 801 when process 500 shown in FIG. 5 enters block 508 and it has been determined that errors exist within the non-native XML elements of the XML document. Processing continues at block 802.

At block 802, the element(s) designated by the validation engine as having errors are underlined within the XML document. It is appreciated that other display indicators (e.g., bolding, italicizing, squiggly lines, etc.) may be used to designate the elements within the XML document as having errors. Processing continues at block 803.

At block 803, the node(s) of the parallel tree corresponding to the error element(s) of the XML document are flagged. In one embodiment, an icon is placed in proximity to the node to indicate that the element corresponding to the node contains an error. In one embodiment, the icon is specific for the type of error that occurred in associating with the error element. Processing continues at decision block 804.

At decision block 804, a determination is made whether the user has right-clicked on an error highlighted in the XML document. If no right-click occurs, processing proceeds to block 806. However, if a right-click does occur, processing continues at block 805.

At block 805, an error display is presented to the user in response to the right-click that gives detail information on the error that occurred and instruction for rectifying the error. In another embodiment, other user inputs, rather than a right-click, may be used to initiate the error display. The error display is described further in the discussion of FIG. 4 above. Processing continues to decision block 806.

At decision block 806, a determination is made whether the user is hovering the mouse pointer over an icon in the parallel tree. If the used decides not to hover the mouse pointer over the error, processing moves to block 808 where processing returns to block 509 of process 500 shown in FIG. 5. When the mouse pointer is hovered over an icon, processing continues at block 807.

At block 807, a tooltip is displayed to the user in response to hovering the mouse pointer over an icon in the parallel tree. In one embodiment, the text of the tooltip provides a simple statement that describes the error that occurred. For example, if a certain element must include content, the text of the tooltip may read, "this element cannot be empty". In one embodiment, other user inputs, rather than hovering over an icon with the mouse pointer, may be used to display the tooltip. An exemplary icon and tooltip are shown in FIG. 4. Processing continues to block to block 808 where processing returns to block 509 of process 500 shown in FIG. 5.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for validation and reporting of schema violations for an extensible markup language (XML) document, wherein the XML document includes native XML elements and non-native XML elements, the method comprising:

locating a change to a non-native XML element within the XML document;

marking a portion of the XML document to signify that the change has occurred with relation to that portion of the XML document;

marking a node within a parallel tree associated with the changed non-native XML to signify that the change has occurred, wherein the node corresponds to the portion of the XML document where the change has occurred, and wherein the parallel tree selectively includes the node corresponding to the changed non-native XML element and excludes at least one node corresponding to at least one of the native XML elements, wherein the at least one of the native XML elements is associated with a corresponding native XML schema and the changed non-native XML element is associated with a corresponding non-native XML schema;

validating the node of the parallel tree against the corresponding non-native XML schema such that the portion of the XML document where the change to the non-native XML element within the XML document occurred is validated;

determining if an error in the changed non-native XML element exists from error data supplied in response to validating the node; and displaying an error notification within the XML document and the parallel tree if the error occurred.

2. The method of claim 1, wherein locating changes to the non-native XML elements further comprises:

identifying a parent element for each non-native XML element where the change occurred; and identifying a closest sibling element for each non-native XML element where the change occurred.

3. The method of claim 1, further comprising generating a new node within the parallel tree when a new non-native XML element is generated in the XML document.

4. The method of claim 3, wherein generating a new node further comprises:

creating an identifier that corresponds to a new non-native XML element, wherein a parent element and a sibling element of the new non-native XML element is determinable from the identifier;

creating an unparented node within the parallel tree;

relating the identifier to the unparented node; and instructing a parent node corresponding to the parent element to adopt the unparented node.

5. The method of claim 1, wherein validating the node of the parallel tree further comprises:

copying content to the parallel tree, wherein the content is associated with the portion of the XML document where the change occurred;

validating the node including the content against the corresponding non-native XML schema; and deleting the content from the parallel tree, such that storage space for the parallel tree is minimized.

6. The method of claim 5, wherein validating the node including the content against the corresponding non-native XML schema includes examining the parallel tree with an XML validation engine according to the non-native XML schema.

7. The method of claim 1, further comprising determining when a timeout or idle condition occurs prior to validating the node of the parallel tree.

8. The method of claim 1, wherein displaying notification of an error further comprises:

indicating the portion of the XML document where the error occurred according to a first display indicator; and indicating the node of the parallel tree that correspond to the portion of the XML document where the error occurred according to a second display indicator.

9. The method of claim 8, wherein user input corresponding to at least one of the first display indicator and the second display indicator produces an error display that provides interactive information regarding the error.

10. The method of claim 8, wherein user input corresponding to at least one of the first display indicator and the second display indicator produces a tooltip that provides textual information regarding the error.

11. A computer-readable storage medium having computer-executable components, comprising:

a first component for generating an extensible markup language (XML) document that includes a first type of elements associated with a first XML schema and a second type of elements associated with a second XML schema, the firsts component being configured to present a display indicative that at least one of the second type of elements violates the second XML schema, wherein the first type and second type are native XML and non-native XML respectively;

a second component for selectively storing in a tree structure nodes that are associated with the second type of elements and the second XML schema and excluding nodes that are associated with the first type of elements and the first XML schema, each node in the tree structure being associated with a corresponding element in the first component, the first component and the second component being synchronized; and a third component for validating the elements associated with the nodes in the tree structure, the third component being arranged to return error data to the first component in response to a violation of the validation, wherein the elements are validated in response to a change in the elements of the first component associated with the nodes in the tree structure.

12. The computer-readable storage medium of claim 11, further comprising a fourth component corresponding to the error data that is arranged to be generated when a user input interacts with an indicator that is displayed within at least one of the XML document and the second component.

13. The computer-readable storage medium of claim 12, wherein the fourth component is further arranged to display information regarding an error corresponding to the error data, including at least one of an error type, instructions for rectifying the error, and a statement of the error.

14. A computer-readable storage medium having computer-executable instructions for validation and reporting of schema violations for an extensible markup language (XML) document, wherein the XML document includes native XML elements and non-native XML elements, the instructions comprising:

locating a change to a non-native XML element within the XML document;

creating a new node within a parallel tree when the change corresponds to the creation of a new non-native XML element within the XML document; wherein the parallel tree selectively includes the node corresponding to the new non-native XML element and excludes at least one node corresponding to at least one of the native XML elements, wherein the at least one of the native XML elements is associated with a corresponding native XML schema and the new non-native XML element is associated with a corresponding non-native XML schema;

marking a portion of the XML document as affected by the change;

marking the new node within the parallel tree to signify that the change has occurred, wherein the new node corresponds to the portion of the XML document affected by the change;

validating the new node of the parallel tree against the corresponding non-native XML schema such that the portion of the XML document where the change to a the non-native XML element within the XML document occurred is validated;

determining if an error in the new non-native XML element exists from error data supplied in response to validating the new node; and if so, displaying a notification of the error within the XML document and the parallel tree.

15. The computer-readable storage medium of claim 14, wherein locating changes to the non-native XML elements further comprises:

identifying a parent element for each non-native XML element where the change occurred; and identifying a closest sibling element for each non-native XML element where the change occurred.

16. The computer-readable storage medium of claim 14, wherein generating a new node further comprises:

creating an identifier that corresponds to a new non-native XML element, wherein a parent element and sibling element of the new non-native XML element is determinable from the identifier;

creating an unparented node within the parallel tree;

relating the identifier to the unparented node; and instructing a parent node corresponding to the parent element to adopt the unparented node.

17. The computer-readable storage medium of claim 14, wherein validating the node of the parallel tree further comprises:

copying content to the parallel tree, wherein the content corresponds to the portion of the XML document;

validating the node including the content against the corresponding non-native XML schema; and deleting the content from the parallel tree, such that storage space for the parallel tree is minimized.

18. The computer-readable storage medium of claim 14, wherein displaying notification of an error further comprises:

indicating the portion of the XML document where the error occurred according to a first display indicator; and indicating the node of the parallel tree that correspond to the portion of the XML document where the error occurred according to a second display indicator.

19. The computer-readable storage medium of claim 18, wherein user input corresponding to at least one of the first display indicator and the second display indicator produces an error display that provides interactive information regarding the error.

20. The computer-readable storage medium of claim 18, wherein user input corresponding to at least one of the first display indicator and the second display indicator produces a tooltip that provides textual information regarding the error.

* * * * *

UNITED STATES PATENT AND TRADEMARK OFFICE
CERTIFICATE OF CORRECTION

| | | |
|---|---|---|
| PATENT NO. | : 7,373,595 B2 | Page 1 of 1 |
| APPLICATION NO. | : 10/184565 | |
| DATED | : May 13, 2008 | |
| INVENTOR(S) | : Brian M. Jones et al. | |

It is certified that error appears in the above-identified patent and that said Letters Patent is hereby corrected as shown below:

In column 13, line 9, in Claim 14, after "to" delete "a".

Signed and Sealed this
Twenty-second Day of February, 2011

David J. Kappos
*Director of the United States Patent and Trademark Office*